April 15, 1969 G. T. MORGAN 3,439,274
LOGARITHMIC GALVANOMETER HAVING SHIFTED ZERO SIGNAL POSITION
Filed Jan. 24, 1966
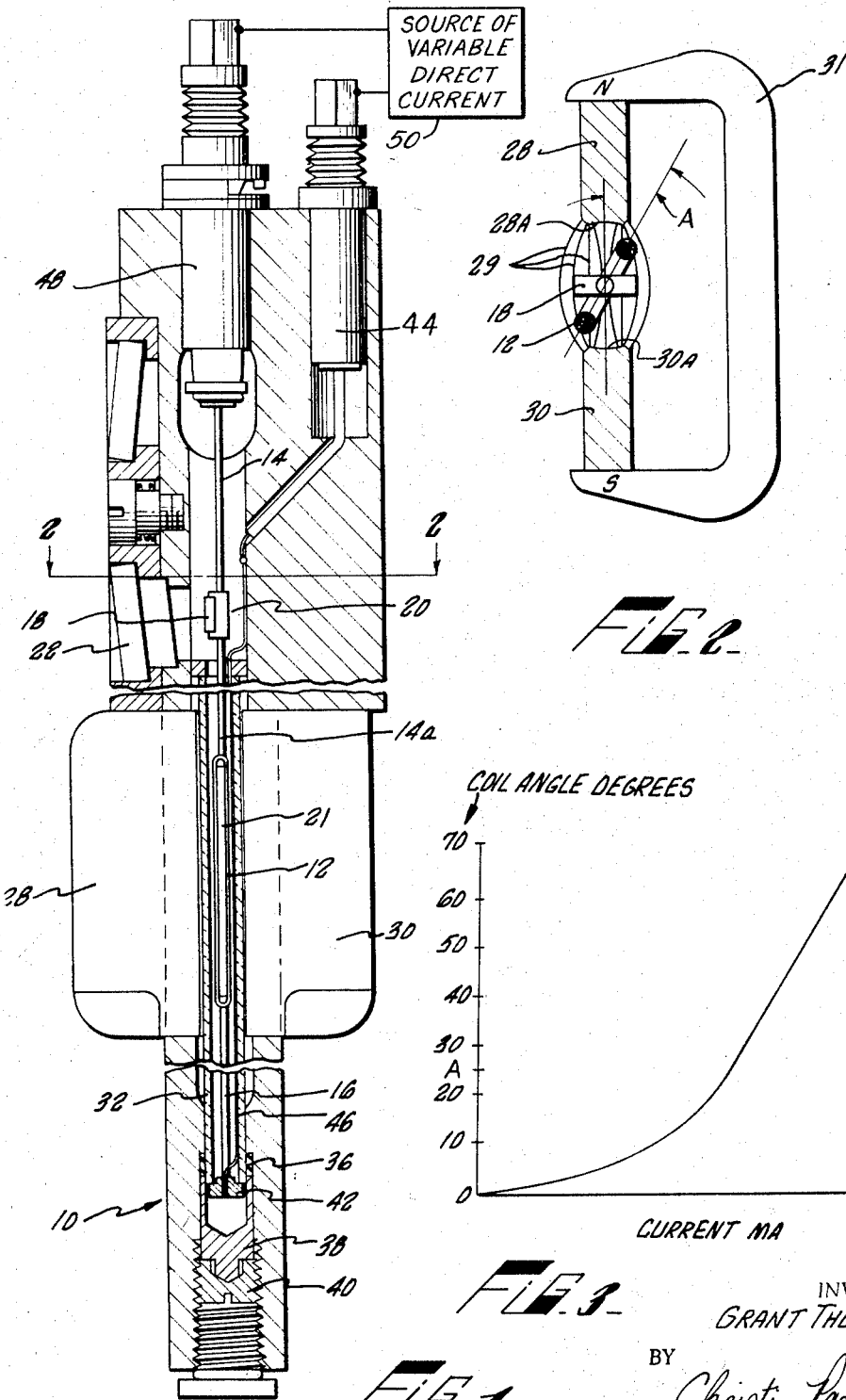
INVENTOR.
GRANT THOMAS MORGAN
BY
Christie, Parker & Hale
ATTORNEYS United States Patent Office 3,439,274
Patented Apr. 15, 1969

3,439,274
LOGARITHMIC GALVANOMETER HAVING SHIFTED ZERO SIGNAL POSITION
Grant Thomas Morgan, San Gabriel, Calif., assignor to Consolidated Electrodynamics Corporation, Pasadena, Calif., a corporation of California
Filed Jan. 24, 1966, Ser. No. 522,425
Int. Cl. G01r 15/10, 5/10
U.S. Cl. 324—132     5 Claims

ABSTRACT OF THE DISCLOSURE

There is described a galvanometer having a logarithmic response over a wide range of angular deflection. This is accomplished by shifting the zero signal angular position of the coil in the direction it is normally rotated by an input current signal to an angle of approximately 25 degrees.

---

This invention relates to galvanometers for measuring input signals and, more particularly, to a galvanometer having a logarithmic response.

A typical galvanometer of the type used in this invention comprises a light weight fine wire coil held in suspension by a pair of stretched wires or ribbons respectively anchored at opposite ends to an enclosing galvanometer case. The suspension means defines the axis of rotary motion of the coil and supports a small mirror for deflection responsive to the rotation of the coil. A window in the galvanometer case is aligned with the mirror to enable reflection of a light beam aimed at the mirror for sensing coil displacement. A pair of magnetic pole pieces are mounted through opposite walls of the case to define a narrow gap within the case and within which the coil is located. The pole pieces extend outwardly of the case for engagement with a magnet to provide a field between the pole pieces.

Heretofore, a mirror was mounted directly on the galvanometer coil or directly above the coil, providing a direct indication of coil deflection in which coil and mirror experience the same angular movement. When such galvanometer movements were used in optical oscillographs, the maximum usable deflection of the coil and mirror together was a limiting parameter in the device.

In the past, it was conventional to permit the coil and mirror to rotate only 15° because of linearity considerations. The current level input to the galvanometer coil for such limited deflection was a small percentage of the safe current which could be applied to the galvanometer. This limitation was primarily imposed by the lack of linearity between coil deflection and the input current past the 15° deflection level. The change in deflection of the coil and mirror with unit increase in current past the 15° angle is no longer linear but, for example, with square pole pieces becomes substantially logarithmic.

A galvanometer in accordance with the present invention uses a particular position of the galvanometer coil in a null or inactive position with relation to the path of the shortest flux lines between the magnet pole faces to obtain a logarithmic deflection of the coil with changes in the input current to the coil over the full useful range of the galvanometer. The galvanometer uses a mirror that deflects only a fraction of the coil deflection and thereby permits larger current inputs to the coil and coil deflections to be measured without changing the optical limits of the associated unit.

In brief, the invention is directed to a galvanometer having a suspension system enclosed by a case with a galvanometer coil mounted upon the suspension system disposed opposite a pair of magnets. In the null or zero input position, the galvanometer coil is displaced at an angle to the shortest lines of flux between the magnet pole faces. The mirror is supported by the galvanometer suspension system and is spaced from both the coil and the fixed end of the suspension system. The mirror by being positioned between the coil and the case rotates proportionately less than the coil rotation.

The invention will become apparent upon reading the description in connection with the drawings, in which:

FIGURE 1 is a cross-sectional view of the galvanometer embodying the invention;

FIGURE 2 is a schematic partial cross-sectional view taken along line 2—2 of FIGURE 1 and showing the galvanometer coil and its relation with the magnet pole faces in an inactive position; and FIGURE 3 is a response curve for the galvanometer and shows coil rotation with changes in the log of the input current.

The galvanometer comprises an elongated case 10 which encloses a suspension system. The suspension system comprises a rotatable elongated coil 12 which is supported by an upper flexible suspension wire 14, 14a and a lower suspension wire 16. A small mirror 18 is affixed to a stiffening tube 20 which is affixed between the upper suspension wire 14 and the lower section 14a. Preferably, the center portion of the coil 12 is reinforced by a stiffening element 21 which extends longitudinally inside the coil and which is bonded to the coil with cement.

A lens 22 is supported in the galvanometer case 10 adjacent the mirror 18 so that light may be directed to the mirror from a source outside the case and so that the light which is reflected by the mirror through the lens 22 may be employed to ascertain the deflection of the mirror. Thus the light reflected by the mirror serves as a measure of the rotation of the coil 12, which in turn is dependent upon the current which flows through the coil.

A pair of permeable pole pieces 28 and 30 are mounted through opposite walls of the galvanometer case to define a narrow gap in which the galvanometer coil is located. This serves to increase the intensity of the magnetic flux which acts upon the coil. A magnet, as indicated at 31 in FIGURE 2, may be used to produce the field in the gap between the pole pieces.

A dampening tube 32 is provided with fluid within the dampening tube, the fluid providing a dampening force upon the rotary movement of the coil and its associated stiffener, so as to provide liquid dampening.

Preferably, the dampening tube 32 is composed of an insulating material, such as glass, and it is supported between an annular support 34 at the upper portion of the suspension system. The gasket is secured by a cup 38 which in turn is positioned by a screw 40. The lower suspension wire is soldered to a conductive cup 42 which rides on the lower end of the dampening tube. A conductor 46 extends from the cup 42 inside the tube 32 to a terminal piece 44.

Referring now to FIGURE 2, the specific arrangement of the spacial relation of the galvanometer coil 12 and the magnets 28 and 30 is shown. The coil 12 is illustrated in a null position in which the coil is de-energized and in this position allows the mirror 18 to assume a relation which is substantially aligned with the pole pieces.

The upper suspension wire 14, 14a is fixed to a conductive terminal piece 48 and to the coil 12 thus forming a suspension system which may rotate freely at the coil end and which is stationary at the end attached to the case. In accordance with the invention, the mirror 18 is positioned on the upper suspension wire 14 above the rotatable coil 12, as provided by the section of wire 14a. The mirror therefore rotates through an arc which is always less than the arc through which the coil rotates. By making the sections 14 and 14a of wire having the same torsional constant, the relative arc of the mirror is directly proportional to its position along the wire 14, 14a. Thus it is a feature of this invention to compress the deflection of the galvanometer coil into a proportionately smaller arc at the mirror and still accurately record the total deflection of the coil.

The pole pieces 28 and 30 are in spaced relation with respective pole faces 28a and 30a facing each other. The mirror 18 and the coil 12 are shown in the null position which occurs when the coil is de-energized. The pole pieces 28 and 30 provide a series of flux lines 29 which pass in paths of varying lengths between the pole faces 28a and 30a. In a conventional galvanometer, the coil is generally placed parallel to the shortest lines of flux between the magnet pole faces. In contrast to the conventional galvanometer, the coil 12 is initially set at an angle A with respect to the shortest flux lines between the pole faces. The angle A in the preferred embodiment of the invention is approximately 25° relative to the shortest lines of flux between the pole faces.

The reason for pivoting the normal position of the coil relative to the magnets is best understood by referring to FIGURE 3 where the coil deflection is plotted against a logarithmic change in input current flowing through the coil as applied from a direct-current source 50 connected across terminal pieces 44 and 48. As shown in the solid curve, the coil deflection is substantially linear from slightly less than 25° to 70° rotaton. In accordance with this invention, the deflection of the coil with reference to the shortest lines of flux between the pole faces of the magnet as illustrated in FIGURE 2, has the effect of shifting operation to the linear part of the curve for angular deflections from 0° to 45°. The initial 45° of deflection of the coil is now completely linear as a function of the log of the current. The deflection angle of the mirror is of course proportionately less so as to remain within the normal deflection limitations of the oscillograph optical system. Thus it is apparent that rotation of a galvanometer in accordance with the invention greatly increases the capacity of the galvanometer without additional components which in the past were required to increase the capacity of the galvanometer. The logarithmic deflection provides high sensitivity around null position for small level input signals with a compressed scale deflection for large input signals. Thus the galvanometer when used in a recording oscillograph provides a much greater dynamic range than heretofore. It should further be noted that the coil is initially set at an angle from the path of the shortest flux lines in the same direction as the coil is turned by the input current. This is apparent from the curve of FIGURE 3. Current flow must be in a direction to increase the angle of the coil from the initial angle to get a linear log function of operation.

What is claimed is:
1. A galvanometer for measuring a variable direct current comprising magnetic means including a pair of spaced poles projecting toward each other for providing magnetic flux lines extending between the poles, an elongated coil extending along an axis between the poles, torsion means supporting the coil for angular movement of the coil about said axis, the torsion means normally positioning the plane of the coil under a zero current condition at a large acute angle to the lines of flux between the poles, and means for connecting said current to be measured to the coil in a direction such that the current deflects the coil in a direction to increase the size of the acute angle.

2. Apparatus as defined in claim 1 including means for optically sensing the angular position of the coil. optically sensing the angular position of the coil.

3. Apparatus as defined in claim 2 wherein the optical means includes a mirror.

4. Apparatus as defined in claim 3 wherein the torsion means includes a wire suspension on either end of the coil with opposite ends of the wire suspension being anchored in relation to the magnet means, the mirror being secured to said wire suspension at a position intermediate the coil and one end of the suspension, the wire having the same torsional constant between the mirror and the coil and between the mirror and the end of the suspension whereby the angular deflection of the mirror is less than but proportional to the angular deflection of the coil.

5. Apparatus as defined in claim 1 wherein said angle of the coil in relation to the lines of flux with zero current is of the order of 25°.

References Cited

UNITED STATES PATENTS

| 2,648,254 | 8/1953 | Stimson et al. | 324—132 X |
| 2,886,781 | 5/1959 | Tavis | 324—97 X |
| 2,963,650 | 12/1960 | Fisher | 324—97 |

FOREIGN PATENTS 644,659  10/1950  Great Britain.

RUDOLPH V. ROLINEC, *Primary Examiner.*

A. E. SMITH, *Assistant Examiner.*

U.S. Cl. X.R.

324—154

U.S. DEPARTMENT OF COMMERCE

PATENT OFFICE

Washington, D.C. 20231

UNITED STATES PATENT OFFICE
CERTIFICATE OF CORRECTION

Patent No. 3,439,274                                                         April 15, 1969

Grant Thomas Morgan

It is certified that error appears in the above identified patent and that said Letters Patent are hereby corrected as shown below:

Column 2, line 50, "system." should read -- system, and b a gasket 36 at the lower end of the suspension system. --.

Signed and sealed this 14th day of April 1970.

(SEAL)
Attest:

Edward M. Fletcher, Jr.                      WILLIAM E. SCHUYLER, JI

Attesting Officer                                    Commissioner of Patents